(No Model.)
J. M. SMYTH.
NUTMEG GRATER.
No. 334,298. Patented Jan. 12, 1886.
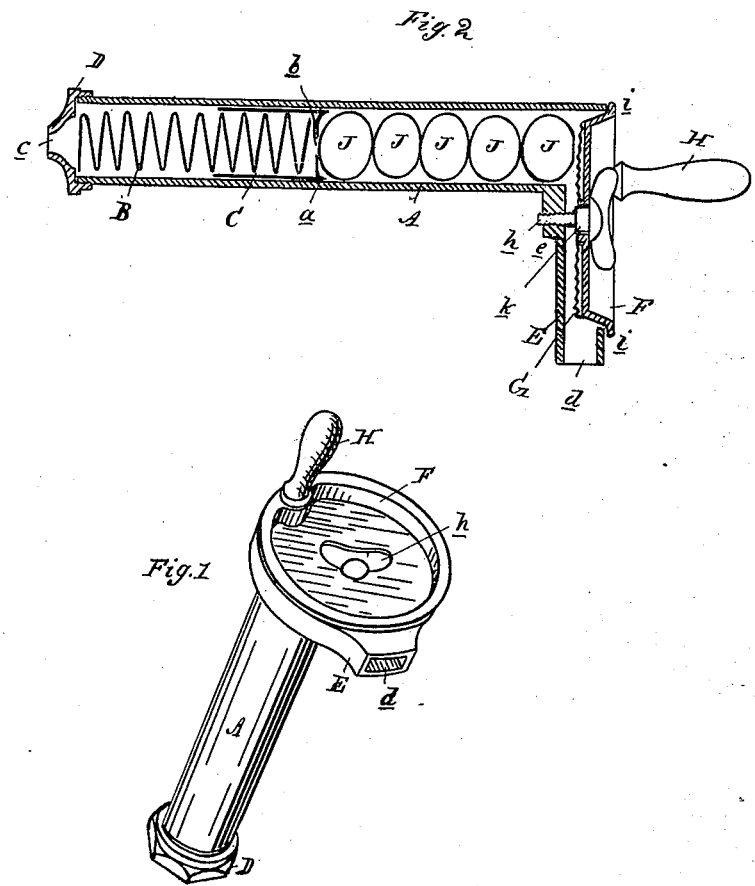
Attest:
John Schuman.
Inventor:
John M. Smyth.
by his Att'y

UNITED STATES PATENT OFFICE.

JOHN M. SMYTH, OF WINDSOR, ONTARIO, CANADA.

NUTMEG-GRATER.

SPECIFICATION forming part of Letters Patent No. 334,298, dated January 12, 1886.

Application filed April 8, 1885. Serial No. 161,532. (No model.)

*To all whom it may concern:*

Be it known that I, JOHN M. SMYTH, of Windsor, in the county of Essex, Province of Ontario, and Dominion of Canada, have invented new and useful Improvements in Nutmeg-Graters; and I do hereby declare that the following is a full, clear, and exact description thereof, reference being had to the accompanying drawings, which form a part of this specification.

This invention relates to certain new and useful improvements in the construction of rotary nutmeg-graters, whereby nutmegs may be grated and the flour thereof distributed at any desired point while the operation of grating is being performed.

The invention consists in the peculiar construction of the parts and their combination to produce this result, as more fully hereinafter described.

Figure 1 is a perspective view of my improved nutmeg-grater. Fig. 2 is an enlarged vertical central section of the same.

In the accompanying drawings, which form a part of this specification, A represents a tube, preferably of four or five inches in length, which performs the double function of a magazine to hold the nutmegs and a handle by which the device is held by the operator. This magazine contains a spring, B, the upper portion of which is inclosed in a cylindrical cap, C, of sufficient length to inclose the spring when the latter is depressed to its fullest extent, and the top $a$ of this cylindrical cap is convex upon its upper surface, and has a central orifice, $b$, therein. The lower end of the tube A is closed by means of a cap-nut, D, through the center of which there is an opening, $c$.

Cast integral with the tube A is the pan E, having a discharge-mouth, $d$. The bottom of this pan is strengthened, as at $e$, and has an orifice tapped through the same to receive the screw $h$. This pan is circular in form, with a prolongation to form the mouth or discharge-opening $d$, as shown very clearly in Fig. 1, and within the pan is placed the circular saucer F, having an annular flange, $i$, which, when the saucer is in place, rests upon the upper surface of the pan and tube, as shown in Fig. 2. To the bottom of this pan there is secured a grater or roughened surface, G, made in any of the known ways, and so secured in place that when worn out it may be removed and replaced by a new grater. The bottom of this saucer is centrally provided with a hub, $k$. Projecting below and through this hub the set-screw $h$ passes, to engage with the female thread in the thickened end $e$ of the pan.

A handle, H, is provided and suitably secured near the periphery of the saucer, as shown in Fig. 1.

In practice the tube A is long enough to fill the hand and enable the operator to obtain a good grasp of the implement. The screw $h$ being removed, the saucer F is then taken off, disclosing the entrance to the tube $a$. At this time the spring will be extended to its fullest extent, presenting the top of the inclosing-cap at the upper end of such tube. The nutmegs J are placed in the tube one after the other by the operator compressing the spring, when the saucer may be replaced and secured, as already described. The device being now ready for operation, the operator grasps in one hand the tube A, and, turning the handle H with the other hand, directs the mouth or discharge $d$ to the point where the flour is to be distributed; or, without disturbing the saucer F, the screw-cap at the lower end of the tube may be removed, allowing the spring to drop out and the tube to be filled from this end, the spring being then replaced, compressed, and the cap screwed on.

As more or less of the meal produced by the grater may at times fall into the tube, I prefer to leave the orifice $c$ through the screw-cap for the purpose of discharging this, although this is not necessary, as when the magazine is filled from the top any material found therein may be emptied.

I do not claim, broadly, a nutmeg-grater provided with a rotatable saucer, nor a spring-inclosing cap adapted to keep the nutmegs in contact with the grater, for I am aware that such are not new.

What I claim as my invention is—

In a nutmeg grater, the tube A, having pan E', strengthened as at $e$, combined with the grating-saucer F, having flanges $i$ and handle H, and the set-screw $h$, passing through said saucer into an orifice in the strengthening-piece $e$ and forming a central bearing for said saucer, substantially as and for the purpose specified.

JOHN M. SMYTH.

Witnesses:
H. S. SPRAGUE,
JOHN SCHUMAN.